United States Patent
Yan et al.

(10) Patent No.: US 12,373,565 B2
(45) Date of Patent: Jul. 29, 2025

(54) DYNAMIC ENV SETTING SIGNATURE BY TWO-DIMENSIONAL RANDOM KEY

(71) Applicant: Fortinet, Inc., Sunnyvale, CA (US)

(72) Inventors: Dengxue Yan, San Jose, CA (US); Jun Li, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 124 days.

(21) Appl. No.: 18/375,452

(22) Filed: Sep. 29, 2023

(65) Prior Publication Data

US 2025/0111055 A1 Apr. 3, 2025

(51) Int. Cl.
- *G06F 9/00* (2018.01)
- *G06F 9/4401* (2018.01)
- *G06F 21/57* (2013.01)

(52) U.S. Cl.
CPC .......... *G06F 21/575* (2013.01); *G06F 9/4401* (2013.01); *G06F 9/4406* (2013.01); *G06F 9/4416* (2013.01)

(58) Field of Classification Search
CPC .............................. G06F 21/575; G06F 9/4401
USPC ............................................................ 713/2
See application file for complete search history.

(56) References Cited

U.S. PATENT DOCUMENTS

| | | | |
|---|---|---|---|
| 8,391,489 B2* | 3/2013 | Paksoy | H04W 12/03 380/278 |
| 11,836,255 B1* | 12/2023 | Goverdovskii | G06F 21/572 |
| 2012/0185683 A1* | 7/2012 | Krstic | G06F 21/44 713/193 |
| 2016/0179431 A1* | 6/2016 | Chen | G06F 21/73 711/170 |
| 2018/0013916 A1* | 1/2018 | Koujimoto | H04N 21/274 |
| 2020/0380493 A1* | 12/2020 | Morales | G06F 21/43 |
| 2022/0121750 A1* | 4/2022 | Lee | G06F 9/4401 |
| 2022/0179963 A1* | 6/2022 | Chen | G06F 21/572 |
| 2024/0054001 A1* | 2/2024 | Jensen | G06F 9/45558 |
| 2024/0143772 A1* | 5/2024 | Farrell | G06F 9/4401 |
| 2024/0320352 A1* | 9/2024 | Jaouen | G06F 21/57 |
| 2024/0427896 A1* | 12/2024 | Shroff | G06F 21/575 |
| 2025/0061729 A1* | 2/2025 | Goel | G06V 20/64 |

* cited by examiner

*Primary Examiner* — Volvick Derose
(74) *Attorney, Agent, or Firm* — Law Office of Dorian Cartwright; Dorian Cartwright

(57) ABSTRACT

During an initial bootup in a bootloader of an SOC, a random number that is unique to the device is stored in secured storage. During a first bootup, a two-dimensional random key is stored in secure storage for encoding the ENV parameters. During a second (subsequent) bootup, the ENV parameters that are current in unsecured storage are compared against the ENV parameters that previously existed in order to identify a mismatch. A remediation security action can be taken responsive to a mismatch between the baseline digest and a dynamic digest. Ultimately, an operating system can be loaded in the bootloader.

20 Claims, 5 Drawing Sheets

DYNAMIC ENV SETTING SIGNATURE BY TWO-DIMENSIONAL RANDOM KEY

FIELD OF THE INVENTION

The invention relates generally to computer networks, and more specifically, for securing bootloader settings with two-dimensional random keys for securing environmental settings from being changed.

BACKGROUND

A boot up process is invoked when a computing system is powered on or reset. A processor is a central component of the computing system and starts with firmware being loaded and run for essential functionality. Next, an operating system (OS) is loaded and run for higher level functionality of the computing system.

Since the bootloader (e.g., BIOS) and the OS share the same processor during a SOC system booting process. Without special central processor unit (CPU) design, it's difficult to physically separate the resources for bootloader and for OS by software. Therefore, OS might accidentally (e.g., by bug) or intentionally (e.g., by hacker) modify the bootloader's settings, which might cause severe security holes. For example, a security level within parameters can be reduced or even turned off, allowing malicious code to operate without remediation.

What is needed is a robust technique for securing bootloader settings from unapproved changes with two-dimensional random keys.

SUMMARY

To meet the above-described needs, methods, computer program products, and systems for securing bootloader settings with two-dimensional random keys.

In one embodiment, during an initial bootup in a bootloader of a system on a chip (SOC) or CPU, a random number that is unique to the device is stored in secured storage. During a first bootup, a two-dimensional random key is stored in secure storage for encoding the ENV parameters. During a second (subsequent) bootup, the ENV parameters that are current in unsecured storage are compared against the ENV parameters that previously existed in order to identify a mismatch. A remediation security action can be taken responsive to a mismatch between the baseline digest and a dynamic digest. Ultimately, an operating system can be loaded in the bootloader for operation of a computing device containing the SOC.

Advantageously, computer performance and reliability are improved with better security.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for securing bootloader settings with two-dimensional random key. Many other embodiments are possible. For example, a multi-dimensional random key can have additional dimensions for higher security levels. Additionally, random numbers can be replaced by random generated asymmetric private keys. Moreover, other parameters besides ENV can be protected from changes at boot up.

I. Systems for Securing Bootloader Parameters (FIG. 1)

Figure 1:
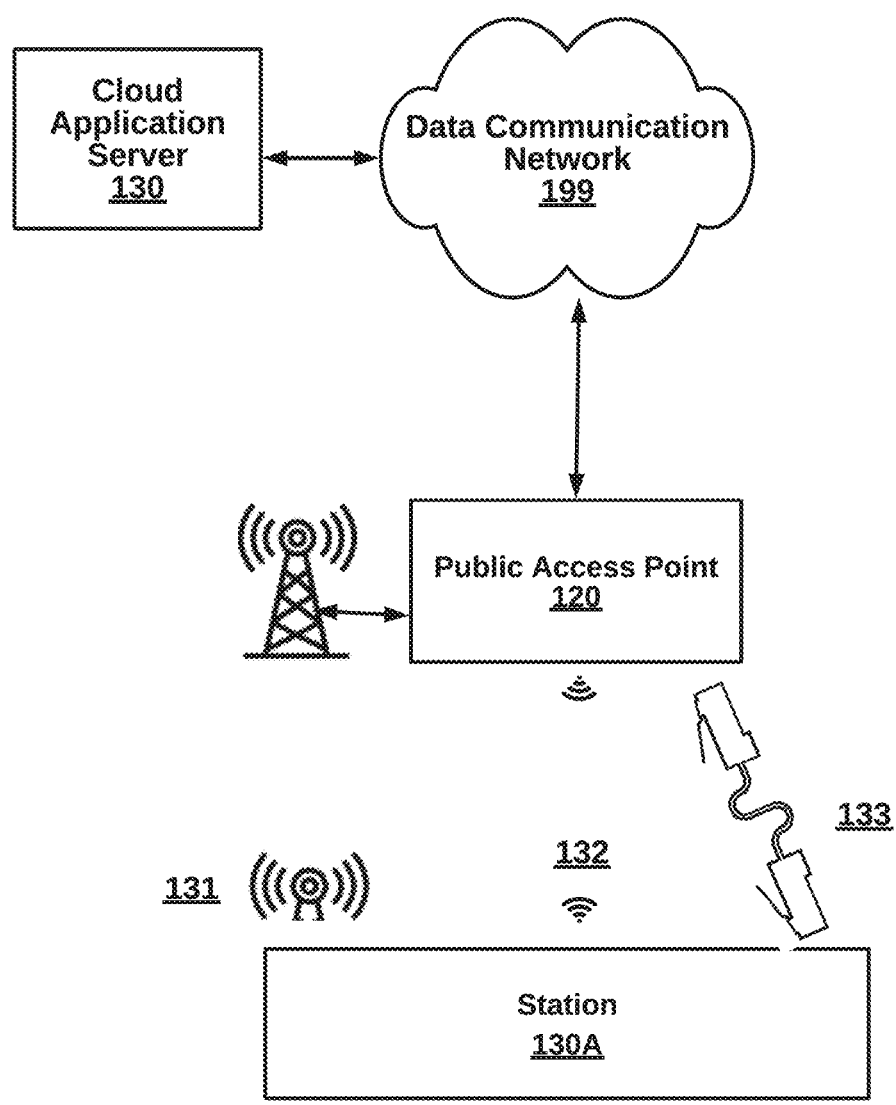
FIG. 1 is a high-level block diagram illustrating an SOC for securing bootloader settings with two-dimensional random keys, according to some embodiments.
Figure 6:
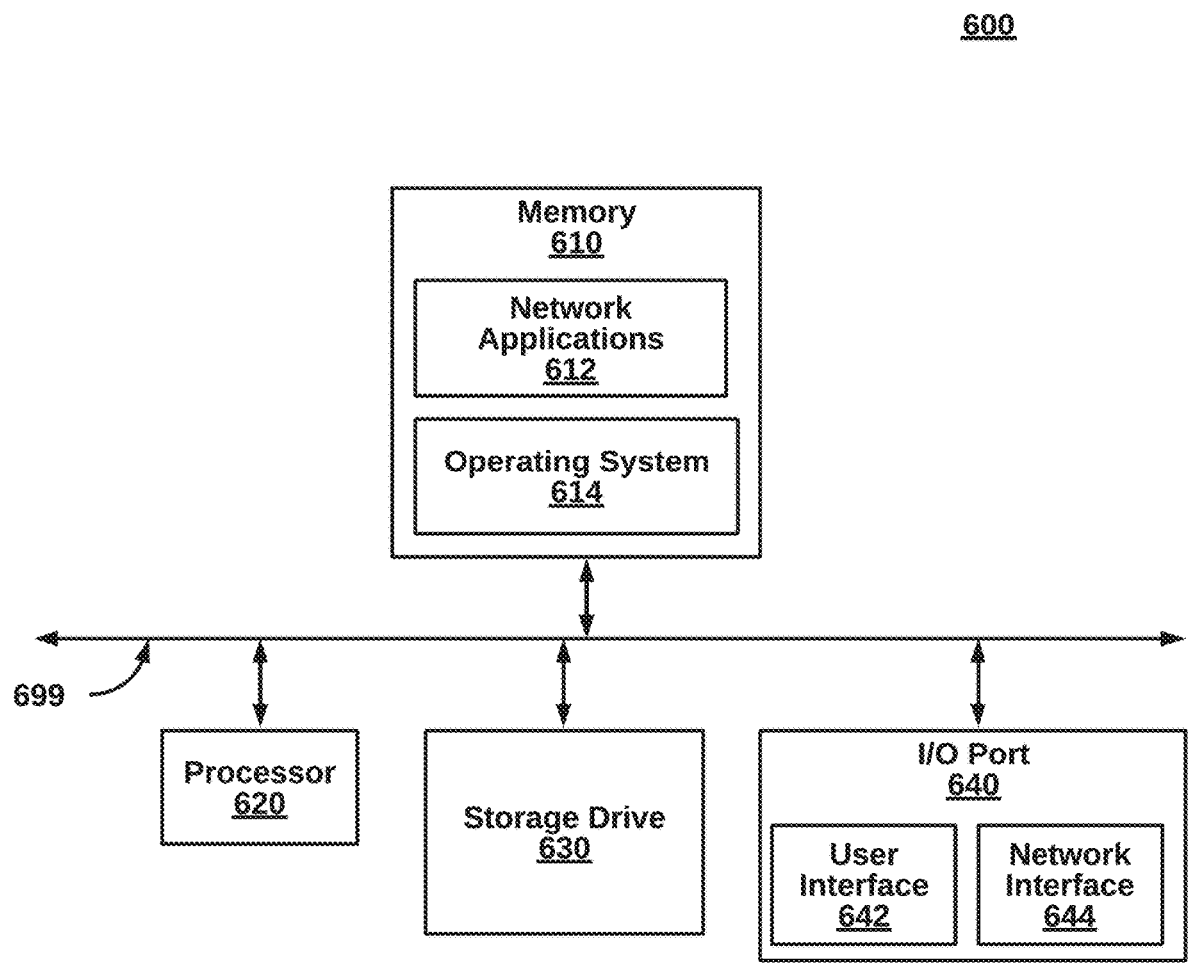
FIG. 6 is a block diagram illustrating an example computing device for the system of FIG. 1, according to one embodiment.

FIG. 1 is a high-level block diagram illustrating a system 100 for securing bootloader settings with two-dimensional random keys, according to an embodiment. The SOC 100 includes a bootloader module 105 a random number generator 110, a secured storage 120 and an unsecured storage 130. Other embodiments of the SOC 100 can include additional components that are not shown in FIG. 1, such as RAM or cache, registers, buses, an arithmetic logic unit (ALU), a clock and a control unit (CU). The components of system 100 can be implemented in hardware, firmware, software, or a combination of both. An example implementation is shown in FIG. 6.

The SOC 100 is an integrated processing environment that uses ENV parameters during operation. The SOC 100 can be a CPU (computer processing unit), a processor, or the like. Processors can be single-core, quad-core, and other variations. In turn, the SOC 100 can be implemented into a computing system, network device, or other processing device, as discussed further in relation to FIG. 6 below.

The bootloader module 105 secures ENV parameters during bootup with a two-dimensional random key. In one embodiment, the two-dimensional random key is digested. A message digest, generally, refers to a cryptographic hash function containing a string of digits created by a one-way hashing function. The message digest can be a fixed-size.

The random number generator 110 dynamically generates random numbers during bootup for temporary use and also generates random numbers for long-term use. A first random number can be a root key of the SOC 100 generated during a first-time use and stored in the secured storage 120. A second random number can be an intermediate key mainly to encrypt a third random number. The third random number can be a final key to encrypt an ENV digest including environmental parameters. A fourth random number can make digest of ENV be of random value. The random numbers can be generated by secured firmware during each boot-up and destroyed after use to prevent compromise.

The secured storage 120 is a protected memory area that is not accessible to the operating system. Secure firmware can run in the secure storage 120 each time the system powers on or reboots. The secure storage 120 can store temporary parameters and temporary random numbers. In a preferred embodiment, the secured storage 120 is private to the SOC 100 or MCU such that no method can access from outside once enabled. Some implementations allow toggling of a security mode.

The unsecured storage 130 is a nonprotected memory that is accessible to the operating system. After bootup, the operating system may automatically, or by manual entry, update settings, such as the ENV settings.

II. Methods for Securing Bootloader Parameters (FIGS. 2-5)

Figure 2:
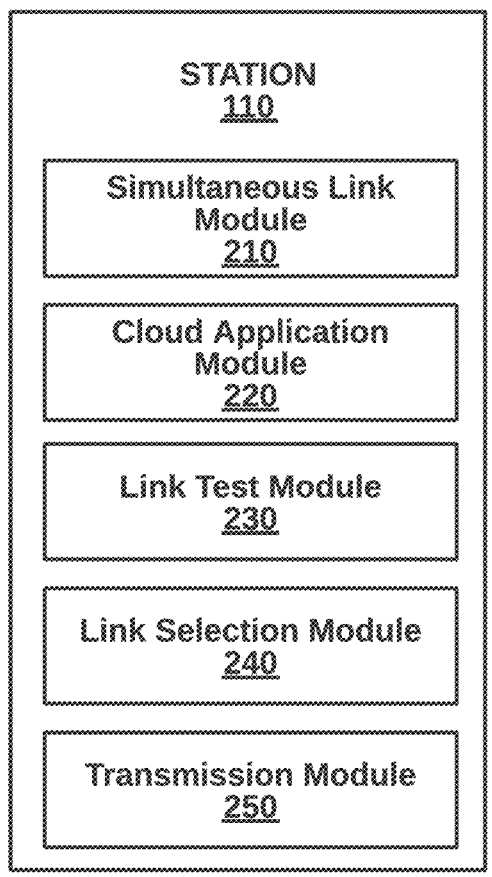
FIG. 2 is a high-level flow diagram illustrating a method for securing bootloader settings with two-dimensional random keys, according to an embodiment.

FIG. 2 is a high-level flow diagram illustrating a method 200 for securing bootloader settings with two-dimensional random keys, according to an embodiment.

At step 210, during an initial bootup after manufacture and deployment, a random number that is unique to the device is stored in secured storage. A check at bootup quickly determines if the initial bootup storage has occurred already, causing a bypass of the method 200. A compromise of the secured storage is thus contained to a single device. At step 220, during a first bootup, a two-dimensional random key is stored in secure storage for encoding the ENV parameters. A resulting baseline digest preserves a current state of the parameters for comparison. At step 230, during a second (subsequent) bootup, the ENV parameters that are current in unsecured storage are compared against the ENV parameters that previously existed in order to identify a mismatch of parameters. At step 240, a remediation security action is taken. On the other hand, if there is no mismatch, an OS is clear for loading. In still another embodiment, legitimate or legal changes can be made to ENV parameters. In this case, an old two-dimensional random key is erased and a new one is stored in unsecured memory. The following figures provide more details to the overall process.

Figure 3:
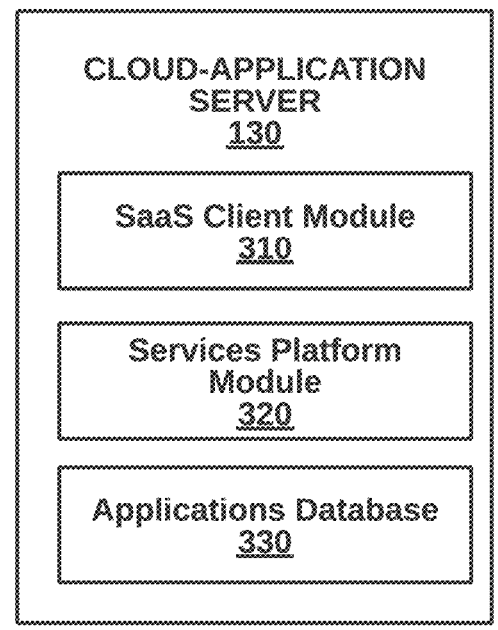
FIG. 3 is a more detailed flow diagram illustrating a step for setting up a secure storage during an initial bootup, from the method of FIG. 2, according to one embodiment.

Specifically, FIG. 3 is a more detailed flow diagram illustrating the step 210 for setting up a secure storage during an initial bootup, from the method of FIG. 2, according to one embodiment. At step 310, a secure storage is checked for a first random number after purchase and out-of-the-box set up. In one embodiment, no random number is set during manufacture. Responsive to not having the first random number, at step 320 the first random number is generated by a random number generator and stored persistently in secured storage. At step 330, the SOC is automatically rebooted and the first random number persists. The first random number is securely hidden from compromise.

Figure 4:
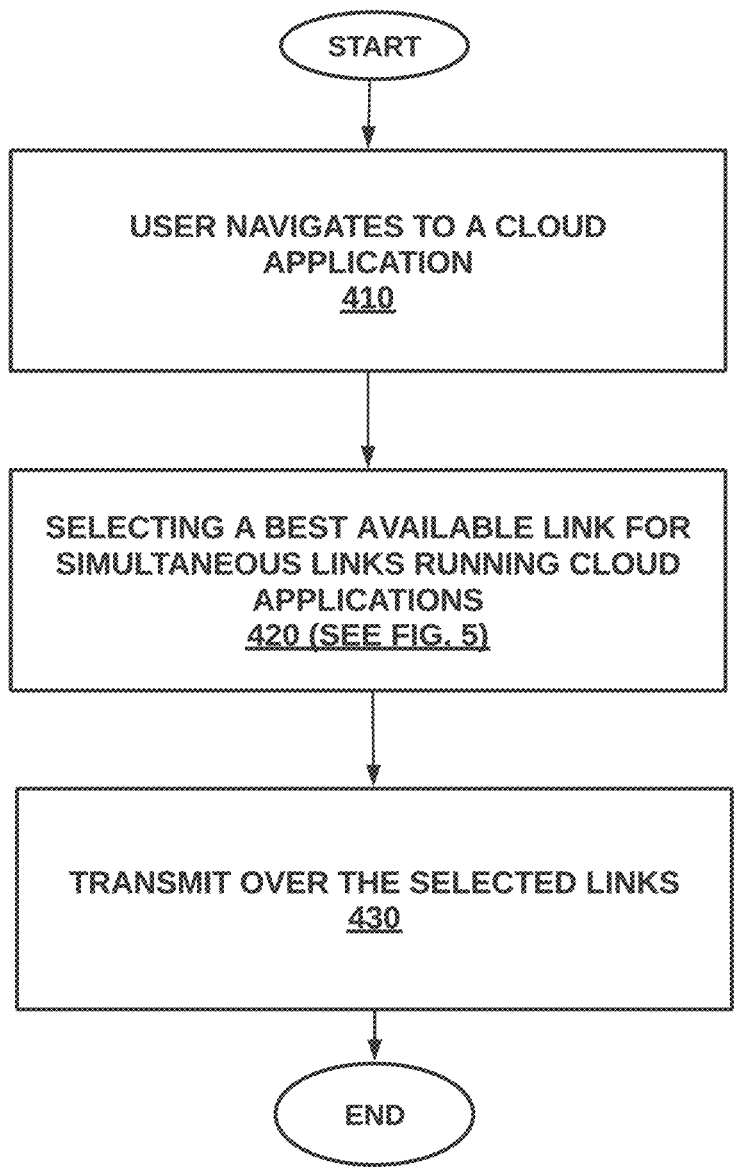
FIG. 4 is a more detailed flow diagram illustrating a step for generating a two-dimensional random key during a first noninitial bootup, from the method of FIG. 2, according to one embodiment.

Next, FIG. 4 is a more detailed flow diagram illustrating the step 220 for generating a two-dimensional random key during a first noninitial bootup, from the method of FIG. 2, according to one embodiment. At step 410, a two-dimensional random key is generated and encrypted by the first random number. In one embodiment, a second random number from a random number hardware, and a third random number from the random number hardware, both random numbers being dynamically generated and used temporarily before being destroyed. The third random number is encrypted using the second random number. The second random number and the encrypted third random number can be encrypted using the first random number.

At step 420, the two-dimensional random key, generated in secure storage, is stored in unsecured storage. At step 430, baseline data is digested to include one or more unsecured ENV parameters and a fourth random number generated by a random number generated. At step 440, an environmental signature is generated by encrypting digested baseline with the third random number, and stored in unsecured storage.

Figure 5:
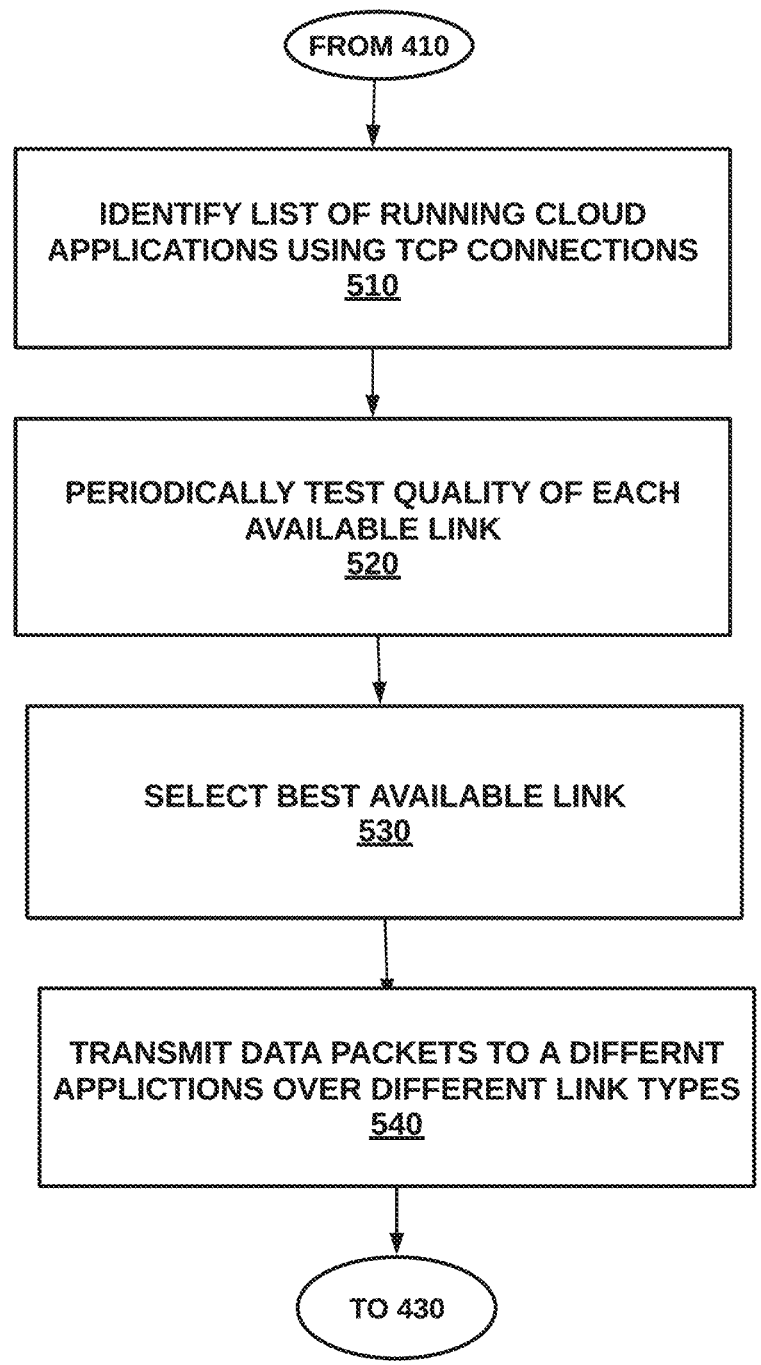
FIG. 5 is a more detailed flow diagram illustrating a step for verifying ENV parameters during a second noninitial bootup, from the method of FIG. 2, according to one embodiment.

Finally, FIG. 5 is a more detailed flow diagram illustrating the step 230 for verifying ENV parameters during a second noninitial bootup, from the method of FIG. 2, according to one embodiment. At step 510, the baseline digest and the fourth random number are recovered from the environmental signature by decrypting the environment signature stored using the third random number in unsecured storage.

At step 520, a dynamic digest is calculated from the unsecured ENV parameter and the decrypted fourth random number from the decrypted environmental signature. At step 530, the baseline digest is compared against the dynamic digest. At step 540, responsive to a mismatch between the baseline digest and the dynamic the dynamic digest, a remediation action can be taken.

III. Computing Device for Securing Bootloader Parameters (FIG. 6)

FIG. 6 is a block diagram illustrating a computing device 600 for use in the system 100 of FIG. 1, according to one embodiment. The computing device 600 is a non-limiting example device for implementing the SOC 100. The computing device can be, for example, a Wi-Fi controller, an access point, a station, a network device, a smart phone or other general computer device relying upon processors.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a bootloader module of an SOC (system on a chip) for securing bootloader settings with two-dimensional random keys, the method comprising:

during a first bootup in secured storage:
  receiving a first random number that is permanently stored in secured storage;
  generating a two-dimensional random key, in secured storage, encrypted by the first random number of the secure storage by generating a second random number from a random number hardware, generating a third random number from the random number hardware, wherein the second and third random numbers are dynamic, encrypting the third random number using the second random number, and encrypting the second random number and the encrypted third random number using the first random number;
  storing the two-dimensional random key in an unsecured storage;
  digesting baseline data comprising an unsecured ENV parameter and a fourth random number generated from the random number hardware;
  generating an environment signature by encrypting the baseline digested data with the third random number;
  storing the environment signature in an unsecured storage;

during a second bootup in unsecured storage:
  recovering the baseline digest and the fourth random number by decrypting the environment signature stored using the third random number in unsecured storage;
  calculating a dynamic digest from the unsecured ENV parameter and the decrypted fourth random number from the decrypted environmental signature;
  comparing the baseline digest against the dynamic digest; and
  responsive to a mismatch between the baseline digest and the dynamic digest, taking a remediation security action.

2. The method of claim 1, wherein the remediation security action comprises at least one of: stopping boot up, booting with restore ENV to default setting of highest security level, and booting up with a notification or warning.

3. The method of claim 1, wherein the mismatch is sourced from an operating system.

4. The method of claim 1, wherein the mismatch is intentionally sourced from a malicious attack.

5. The method of claim 1, further comprising:
prior to the first bootup, generating the first random number by the random number hardware;
permanently storing the first random number in the secured storage; and
rebooting the SOC.

6. The method of claim 1, further comprising: deleting the first and second random numbers.

7. The method of claim 1, further comprising: responsive to a match between the secured stored digest and the calculated digest, allowing an operating system to be loaded.

8. The method of claim 7, wherein the operating system updates the ENV after loading.

9. The method of claim 1, wherein the two-dimensional key is generated in secure storage.

10. The method of claim 1, further comprising:
determining that the mismatch is based on a legal change to the ENV parameter; and
responsive to the legal change, generating a new two-dimensional random key and storing in unsecured memory.

11. A non-transitory computer-readable medium in a bootloader module of an SOC (system on a chip) for securing bootloader settings with two-dimensional random keys, the method comprising:
during a first bootup in secured storage:
receiving a first random number that is permanently stored in secured storage;
generating a two-dimensional key, in secured storage, encrypted by the first random number of the secure storage by generating a second random number from a random number hardware, generating a third random number from the random number hardware, wherein the second and third random numbers are dynamic, encrypting the third random number using the second random number, and encrypting the second random number and the encrypted third random number using the first random number;
storing the two-dimensional random key in an unsecured storage;
digesting baseline data comprising an unsecured ENV parameter and a fourth random number generated from the random number hardware;
generating an environment signature by encrypting the baseline digested data with the third random number;
storing the environment signature in an unsecured storage;
during a second bootup in unsecured storage:
recovering the baseline digest and the fourth random number by decrypting the environment signature stored using the third random number in unsecured storage;
calculating a dynamic digest from the unsecured ENV parameter and the decrypted fourth random number from the decrypted environmental signature;
comparing the baseline digest against the dynamic digest; and
responsive to a mismatch between the baseline digest and the dynamic, take a remediation security action.

12. The method of claim 11, wherein the remediation security action comprises at least one of: stopping boot up, booting with restore ENV to default setting of highest security level, and booting up with a notification or warning.

13. The method of claim 11, wherein the mismatch is sourced from an operating system.

14. The method of claim 11, wherein the mismatch is intentionally sourced from a malicious attack.

15. The method of claim 11, further comprising:
prior to the first bootup, generating the first random number by the random number hardware;
permanently storing the first random number in the secured storage; and
rebooting the SOC.

16. The method of claim 11, further comprising: responsive to a match between the secured stored digest and the calculated digest, allowing an operating system to be loaded.

17. The method of claim 16, wherein the operating system updates the ENV after loading.

18. The method of claim 11, further comprising:
determining that the mismatch is based on a legal change to the ENV parameter; and
responsive to the legal change, generating a new two-dimensional random key and storing in unsecured memory.

19. A bootloader module of an SOC (system on a chip) for securing bootloader settings with two-dimensional random keys, the Wi-Fi controller comprising:
a random number generator;
a secured storage to run secure firmware, during a first bootup in secured storage, to:
receive a first random number that is permanently stored in the secured storage, generating a two-dimensional random key, in secured storage, encrypted by the first random number of the secure storage by generating a second random number from a random number hardware, generating a third random number from the random number hardware, wherein the second and third random numbers are dynamic, encrypting the third random number using the second random number, and encrypting the second random number and the encrypted third random number using the first random number;
store the two-dimensional random key in an unsecured storage;
digest baseline data comprising an unsecured ENV parameter and a fourth random number generated from the random number hardware;
generate an environment signature by encrypting the baseline digested data with the third random number; and
store the environment signature in an unsecured storage; and
an unsecured storage to run nonsecured firmware, during a second bootup in unsecured storage, to:
recover the baseline digest and the fourth random number by decrypting the environment signature stored using the third random number in unsecured storage;
calculate a dynamic digest from the unsecured ENV parameter and the decrypted fourth random number from the decrypted environmental signature;
compare the baseline digest against the dynamic digest; and
responsive to a mismatch between the baseline digest and the dynamic, take a remediation security action.

20. The bootloader module of claim 19, wherein the unsecured storage loads and runs an operating system.

\* \* \* \* \*